June 4, 1940.   M. HUTCHINSON   2,203,091
TUBE CAKE PAN WITH CAKE LOOSENING MEANS
Filed Feb. 15, 1939
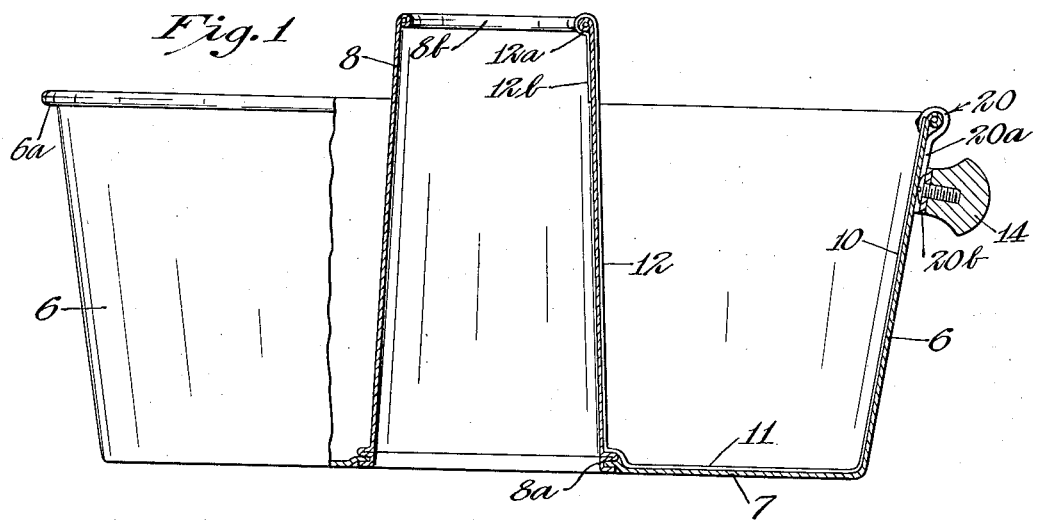
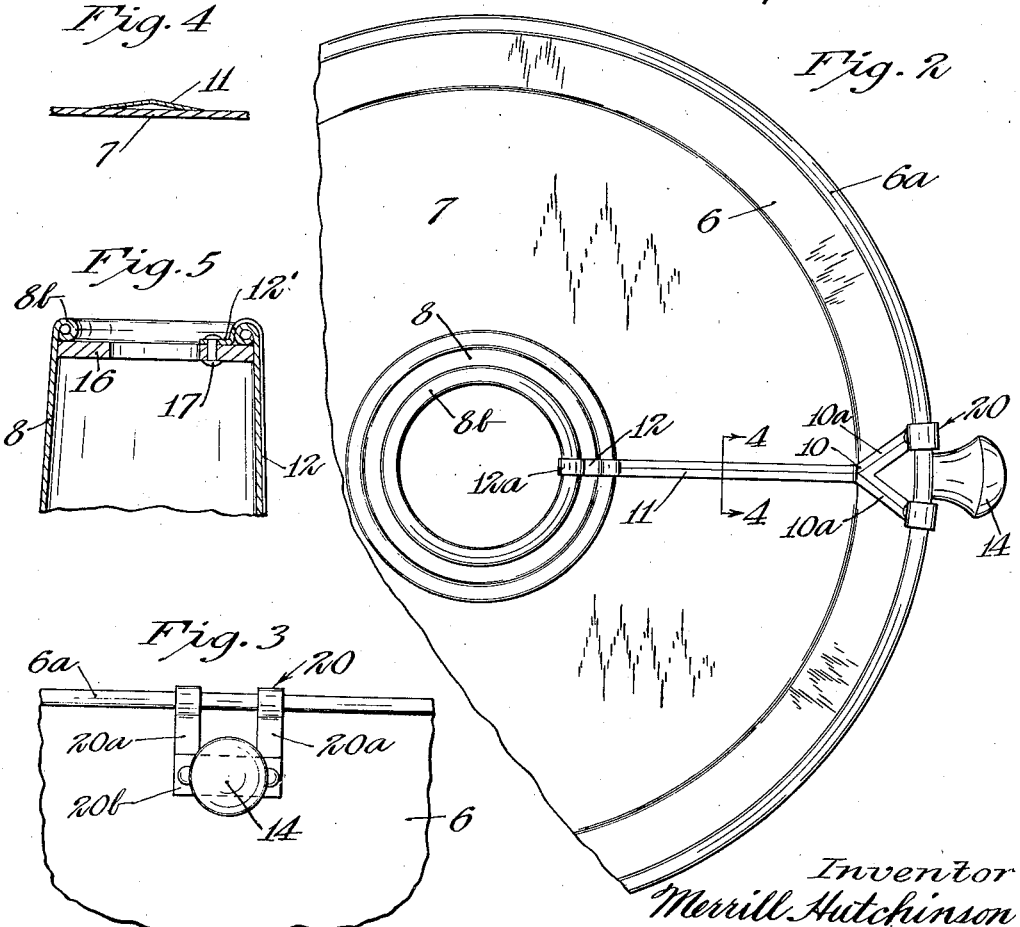
Inventor
Merrill Hutchinson
By Williamson & Williamson
Attorneys Patented June 4, 1940

2,203,091

UNITED STATES PATENT OFFICE 2,203,091

TUBE CAKE PAN WITH CAKE LOOSENING MEANS

Merrill Hutchinson, Edina, Minn.

Application February 15, 1939, Serial No. 256,429

3 Claims. (Cl. 53—6)

This invention relates generally to pans for baking or otherwise preparing foods such as cake, and particularly to so-called tube pans provided with an upstanding axial tube which produces an enlarged central aperture in the cake or other food and which in baking permits adequate distribution of heat to the central portion of the food baked. Such pans are extensively used for baking cakes such as "angelfood" and "sponge."

My invention relates more specifically to the provision of simple, inexpensive and sanitary mechanism associated with a pan of the type described for disengaging or loosening the food from the pan to enable the cake or other food product to be easily removed.

It is an object of my invention to provide in a tube pan of the class described, a mechanism which will quickly loosen or disengage the cake or other food after it is baked or otherwise prepared, and which particularly will free the food from the peripheral wall of the upstanding tube.

A further object is the provision of a tube cake pan or the like having food loosening or disengaging means associated therewith for separating the cake or other food from the interior peripheral wall of the pan and bottom, as well as for disengaging the cake or other food from the upstanding vertical tube.

Another object is the provision of a pan and mechanism of the class described wherein such mechanism is easily operated by the manipulation of a conveniently located handle.

These and other objects and advantages of the invention will more fully appear from the following description made in connection with the accompanying drawing, wherein like reference characters refer to similar parts throughout the various views, and in which—

Fig. 1 is a view partly in vertical section and partly in side elevation of a tube cake pan having associated therewith one embodiment of my invention;

Fig. 2 is a fragmentary top plan view of the same;

Fig. 3 is a fragmentary side elevation showing the operating handle and rim engaging guiding means;

Fig. 4 is a detail cross section taken on the line 4—4 of Fig. 2, and

Fig. 5 is a fragmentary vertical section showing a somewhat different form of connecting the tube scraping element with the upper portion of the tube to provide for swinging movement of the scraper element.

In the form of the invention illustrated in Figs. 1 to 4 inclusive, a tube cake pan of more or less conventional type as illustrated having the upwardly flaring peripheral wall 6, the flat bottom 7 and the vertical, upwardly tapered tube 8 which, as shown, is crimped at 8a at its lower end about the centrally apertured portion. Tube 8 extends axially of the pan and terminates at its upper end as shown in a rolled inwardly disposed bead 8b.

The upper edge of the pan is provided with the usual outwardly disposed rolled bead 6a.

My improved food loosening or disengaging mechanism shown comprises a scraper member which may be of integral construction in the form of a narrow, thin strip of metal having a scraper element 10 which is disposed substantially flush against the inner peripheral wall 6 of the pan and having a second scraper element 11 disposed substantially flush against the bottom of the pan, and a third scraper element 12 disposed substantially flush against the peripheral wall of tube 8. As stated, the several scraper elements may be integrally formed, or if desired, may be separately formed and rigidly secured together. It is desirable that the connecting portions of the strip or connections conform as closely as possible to the contour of the pan and base of the tube to produce the most efficient releasing or loosening of the food at such points.

The upper end of scraper element 10 is preferably Y-shaped at 10a to provide spaced strips which are attached by rivets or other securing means to a guide member 20 which surrounds the bead 6a of the pan, conforming closely in shape to said bead and which extends downwardly some distance below the bead on the outside of the pan, providing bearing surface portions 20a spaced outwardly of the scraper element 10. The depending portions 20a are connected by a cross piece 20b to which a centrally disposed handle 14 is secured.

The opposite end of the scraper member at the upper end of element 12 is bent to surround and closely conform at 12a to the bead 8b of the tube, and then bent downwardly to form the tab 12b bearing against the inner peripheral wall of tube 8 and forming a smooth guiding means.

I prefer to bend the entire scraper member comprising elements 10, 11 and 12 slightly along a central longitudinal line giving approximately the cross sectional shape illustrated in Fig. 4. This strengthens and gives rigidity to the thin member, but in addition causes each of the elements 10, 11 and 12 to be drawn in operation toward the surface of the pan with which it is associated, effecting a more efficient separating or scraping action of the pan with less cutting of the food material.

If the scraper member or elements 10 or 12 thereof are constructed of somewhat resilient material to permit springing of the tabs 20a and 12b respectively, the device may be made detachable, although this is unnecessary since the entire pan and device may be readily cleaned by moving the scraper slightly while the pan is scoured.

In operation when food is baked or otherwise prepared and it is desired to loosen the same from the pan for removal, the scraper member is swung through 360 degrees about the pan merely by swinging the handle member 14, the spaced portions 20a of the guide member engaging the bead 6a of the pan and smoothly guiding the outer portion of the scraper member while the engagement of the turned end 12a of element 12 and bearing surface of 12b smoothly guides the inner end of the scraper. Such swinging action of the scraper effectively loosens or dislodges the cake or other article of food from all contacting surfaces of the pan and the pan may then be inverted for removal of the cake.

In baking "angelfood" and other cakes, before operation of my cake loosening mechanism the pan is inverted and may be supported upon the outer end of tube 8 which, it will be noted, extends considerably above the plane of the rim of the pan. After cooling, the handle 14 is manipulated in the manner described, and the cake may then be readily removed in the desired inverted position.

In Fig. 5 a somewhat different guiding means for the upper end of element 12 is provided in the form of a ring 16 which loosely fits the upper end of tube 8 just below bead 6 and which is secured by such means as a rivet 17 to an outturned end 12' of the element 12.

I realize that loosening means in the form of blades or scrapers for the bottoms of pie pans and like pans are old, but believe I am the first to provide a loosening device for a tube pan where a separating action between the upwardly extending tube and the cake or other food product is obtained, as well as separating or loosening of the other portions of the pan by the manipulation of a simple, rigidly connected mechanism.

It will, of course, be understood that various changes may be made in the form, details, arrangement and proportions of the various parts without departing from the scope of my invention.

What is claimed is:

1. In a pan of the type having an upstanding tube axially disposed thereof, food loosening mechanism comprising, a scraper element disposed substantially flush against the inner peripheral wall of the pan and extending longitudinally thereof, guide means connected with the upper end of said scraper element for engaging the edge of said pan to permit free sliding movement of said scraper element, a second scraper element secured to the lower end of said first scraper element and engaging the bottom of said pan and extending to the base of said tube, and a third scraper element secured to said second scraper element and extending upwardly against the peripheral wall of said tube, and guiding means secured to the upper end of said third scraper element and engaging the upper end of said tube.

2. In a pan for baking a cake having an enlarged axial aperture therethrough, cake loosening mechanism comprising, a substantially vertically disposed element revoluble about the vertical axis of the pan for loosening the interior edge of the cake defining said aperture, a scraper blade having an element thereof disposed longitudinally against the inner peripheral wall of the pan and having another element in the form of a continuous narrow blade secured to the lower end of said first mentioned element and extending transversely across the bottom of the pan with its inner end rigidly secured to said vertically disposed revoluble element, the edges of said blade element extending without interruption to its juncture with said vertically disposed, revoluble element, means associated with said pan for guiding said elements in their turning movement, and a handle member by which said elements may be turned in unison.

3. The structure set forth in claim 1, said several scraper elements being formed from an integral strip of material, said strip throughout its length being bent on its longitudinal center line to produce downwardly directed cutting edges on the longitudinal sides of said strips adapted in the cutting operation to draw said elements toward the respective surfaces of the pan.

MERRILL HUTCHINSON.